(12) United States Patent
Huang et al.

(10) Patent No.: US 10,471,592 B2
(45) Date of Patent: Nov. 12, 2019

(54) PROGRAMMING METHOD OF A ROBOT ARM

(71) Applicant: QUANTA STORAGE INC., Taoyuan (TW)

(72) Inventors: Shih-Jung Huang, Taoyuan (TW); Pei-Jui Wang, Taoyuan (TW); Chien-Te Ye, Taoyuan (TW); Shih-Kuo Chen, Taoyuan (TW); Fu-Jia Hsu, Taoyuan (TW)

(73) Assignee: QUANTA STORAGE INC., Taoyuan (TW)

(*) Notice: Subject to any disclaimer, the term of this patent is extended or adjusted under 35 U.S.C. 154(b) by 196 days.

(21) Appl. No.: 15/493,116

(22) Filed: Apr. 20, 2017

(65) Prior Publication Data
US 2017/0312918 A1    Nov. 2, 2017

(30) Foreign Application Priority Data

Apr. 27, 2016 (CN) .......................... 2016 1 0268376

(51) Int. Cl.
| | | |
|---|---|---|
| *G06F 19/00* | (2018.01) | |
| *B25J 9/16* | (2006.01) | |
| *B25J 13/08* | (2006.01) | |
| *G06F 3/0481* | (2013.01) | |

(52) U.S. Cl.
CPC .............. *B25J 9/163* (2013.01); *B25J 9/1692* (2013.01); *B25J 9/1697* (2013.01); *B25J 13/085* (2013.01); *B25J 13/088* (2013.01); *G06F 3/04817* (2013.01)

(58) Field of Classification Search
CPC ........ B25J 9/163; B25J 9/1697; B25J 13/085; B25J 13/088; B25J 9/1692; G06F 3/04817

See application file for complete search history.

(56) References Cited

U.S. PATENT DOCUMENTS

| | | | |
|---|---|---|---|
| 8,601,435 B2* | 12/2013 | Weatherhead ... | G05B 19/41885 717/107 |
| 10,071,483 B2* | 9/2018 | Shimodaira ............ | B25J 13/085 |
| 2008/0082186 A1* | 4/2008 | Hood .................... | G05B 19/042 700/83 |
| 2011/0010009 A1* | 1/2011 | Saito ...................... | B25J 9/1612 700/253 |
| 2012/0317535 A1* | 12/2012 | Schmirgel .............. | B25J 9/1671 717/100 |
| 2013/0041504 A1* | 2/2013 | Kubota ................. | G05B 19/409 700/246 |
| 2014/0188281 A1* | 7/2014 | Nagai ................... | G05B 19/425 700/264 |
| 2014/0214203 A1* | 7/2014 | Inoue .................... | B25J 9/1661 700/245 |
| 2015/0336269 A1* | 11/2015 | Linnell .................. | B25J 9/1656 700/245 |

(Continued)

*Primary Examiner* — Ian Jen
(74) *Attorney, Agent, or Firm* — Winston Hsu

(57) ABSTRACT

A programming method for a robot arm includes setting and saving operational configurations of the robot arm, establishing an operation process of the robot arm, selecting the operational position icon for applying to the operation sub-process, displaying a selected operational position icon and an operational configuration sub-icon, modifying an operational configuration displayed on the operational configuration sub-icon for facilitating to execute a programming process of the robot arm.

9 Claims, 8 Drawing Sheets

(56) References Cited

U.S. PATENT DOCUMENTS

| | | | |
|---|---|---|---|
| 2015/0343635 A1* | 12/2015 | Linnell | B25J 9/1671 |
| | | | 700/249 |
| 2016/0001445 A1* | 1/2016 | Setsuda | B25J 9/1679 |
| | | | 700/260 |
| 2016/0114486 A1* | 4/2016 | Huang | B25J 9/1692 |
| | | | 700/254 |
| 2017/0118447 A1* | 4/2017 | Huang | B25J 19/023 |

* cited by examiner

PROGRAMMING METHOD OF A ROBOT
ARM

BACKGROUND OF THE INVENTION

1. Field of the Invention

The present invention illustrates a robot arm, and more particularly, an operation process of the robot arm and a programming method for controlling motion of the robot arm.

2. Description of the Prior Art

With the development of production technologies, factories use visual devices for detecting and positioning objects automatically. The visual devices can guide a robot arm to automatically grab the objects and fabricate products. In order to increase productivity of the robot arm, a programming process of the robot arm can be simplified so that a user can easily install and operate the robot arm for fabricating products.

In a conventional programming process of the robot arm (i.e., Patent TW20160075), a meter device is disposed on the end of the robot arm before the robot arm is programmed. The meter device can detect a distance between the robot arm and a base and then identify the position of a base plane. In prior art, an input interface can be generated by connecting a control panel to the robot arm. Then, a motion program of the robot arm can be executed according to the base and the process can be displayed on the display of the control panel. The motion program can simulate and calibrate a motion track of the robot arm first. Then, the robot arm can be moved according to the motion track controlled by the motion program. Further, the motion program can be modified and can detect all possible additional motion tracks of the robot arm. However, several calibration processes and simulation processes are required for generating an operation process of the robot arm. Thus, controlling the robot arm requires a lot of time and a professional motion programmer.

In another prior art, a six-dimensional sensor is disposed on the end of the robot arm for detecting 3-dimensional forces and 3-dimensional torques applied to the end of the robot arm. When a user hauls the end of the robot arm for machine learning, the sensor disposed on the end of the robot arm can detect force generated by the user. Then, the robot arm can generate forward force to assist the user. Thus, the robot arm can be moved along with a direction of the force generated by the user for catching a workpiece. Further, the robot arm can use a programming device of each axis for automatically recording a motion track during a machine learning period. Then, the robot arm can automatically establish a control program after the machine learning process is completed. Although the control program can be automatically established, the motion track of the robot arm is not accurate. Also, the robot arm requires a hauling force generated by the user for machine learning.

In another prior art, a visual device is disposed on the robot arm. The visual device can be moved by controlling the robot arm according to a predetermined operation process. Then, the visual device can capture images around the working environment. The visual device can further process the images and perform an image recognition process for searching a target. Then, the visual device can control the robot arm to move to a position of the target. Then, the robot arm can perform a gripping process, a placing process, a motion process, a combining process, or a spraying process. By doing so, operation complexity of the robot arm can be reduced.

However, in various prior art mentioned previously, a working condition may be changed. For example, a configuration of the base, a configuration of the workpiece, a configuration of the tool, or a configuration of the operation process may be changed. When the working condition is changed, a re-programming process for machine learning must be reconfigured by a professional programmer since a common user does not have programming expertise and cannot easily acquire relative position among the robot arm, the base, the workpiece, and the tool. Thus, operational flexibility of the robot arm is poor. Further, in prior art, the programmer has to check a complicated operation process or program before making amendments of the operation process. In other words, a real-time debugging process of the operation process cannot be performed. Thus, several problems of the programming method of the robot arm are still unresolved.

SUMMARY OF THE INVENTION

The present invention aims at providing a programming method for a robot arm. By using an operational position icon of a predetermined operation process and an operational configuration sub-icon displayed on a display of an operation panel of the robot arm, a quick debugging process and a quick modification process can be performed.

Further, the present invention aims at providing a programming method for a robot arm. When an operation process is programmed, a selected operational position icon previously stored can be changed in order to apply the operation sub-process for executing the operation process of the robot arm. Then, operation flexibility can be increased.

This is achieved by a method described below. A programming method for a robot arm includes setting and saving operational configurations of the robot arm, establishing an operation process of the robot arm, selecting the operational position icon for applying to the operation sub-process, displaying a selected operational position icon and an operational configuration sub-icon on a display of an operation panel of the robot arm, modifying an operational configuration displayed on the operational configuration sub-icon, and completing the operation process of the robot arm.

The operation sub-process is programmed to generate a plurality of standard operation sub-process according to the operational configurations. The operational configurations are default. The operation sub-process saves the operational position icon as an operation name or an operation code. The operational position icon adjoins the operational configuration sub-icon. Configurations of the operation sub-process are modified when configurations of the operational configuration sub-icon are modified. The operational configurations include a workpiece weight, a tool center point, and a base. The robot arm pre-detects the tool center point corresponding to a tool currently used and saves tool center point data of the tool. The tool center point data includes relative position data between the robot arm and the tool for calibrating a motion of the robot arm.

The base is generated by a three-point base generation method or a visual base generation method. The three-point base generation method includes detecting coordinates of three points on different axes of the base by using a meter device disposed on the robot arm for establishing and saving the base. The visual base generation method includes sticking a calibration plate on the base, hauling the robot arm on top of the calibration plate, calibrating an inclination of the robot arm automatically. The robot arm moves and detects the base according to a predetermined focal length for establishing and saving the base.

When a program of the operation process of the robot arm is not modified, a default operation process is directly applied to the program for executing the operation sub-process. When a default operation process or an approximate operation process is applied, a selected operational position icon previously stored is changed in order to apply the operation sub-process for executing the operation process of the robot arm.

These and other objectives of the present invention will no doubt become obvious to those of ordinary skill in the art after reading the following detailed description of the preferred embodiment that is illustrated in the various figures and drawings.

DETAILED DESCRIPTION

For the present invention to achieve the above purpose, the use of technology, hereby cites the preferred embodiment, and with the drawings to be described below.

Figure 1:
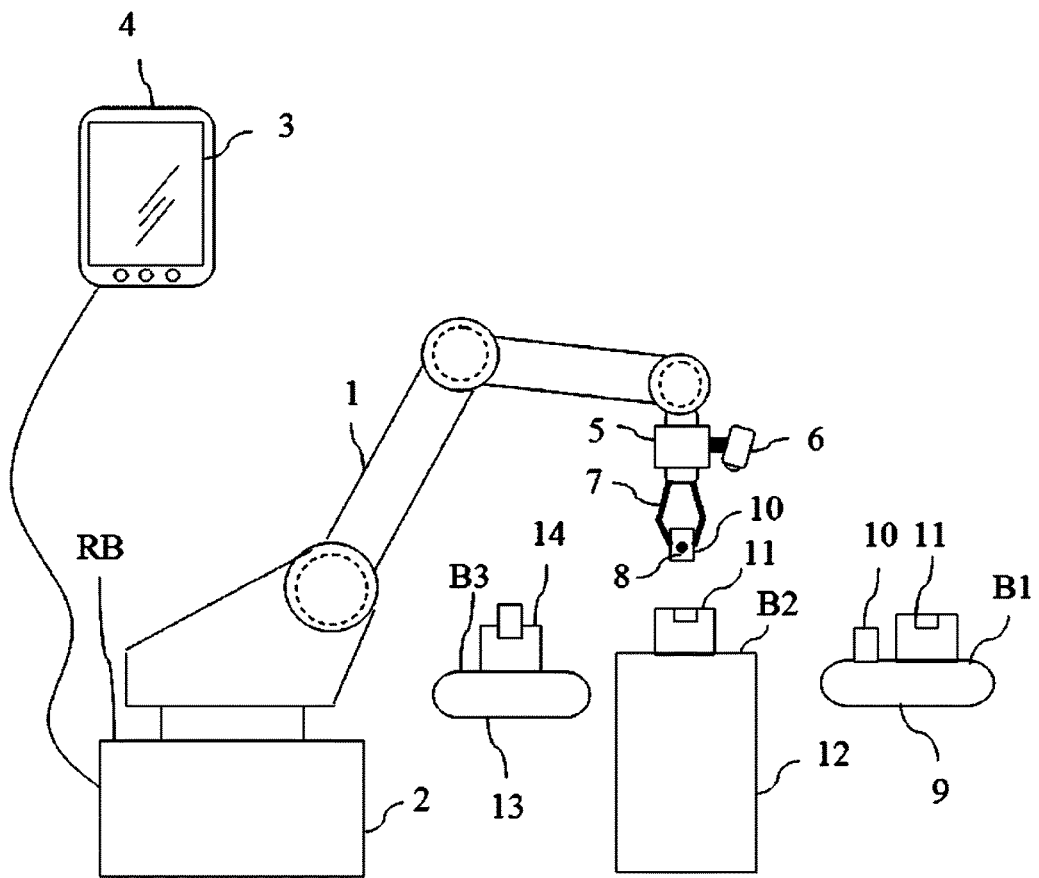
FIG. 1 is an illustration of a robot arm according to the embodiment of the present invention.
Figure 2:
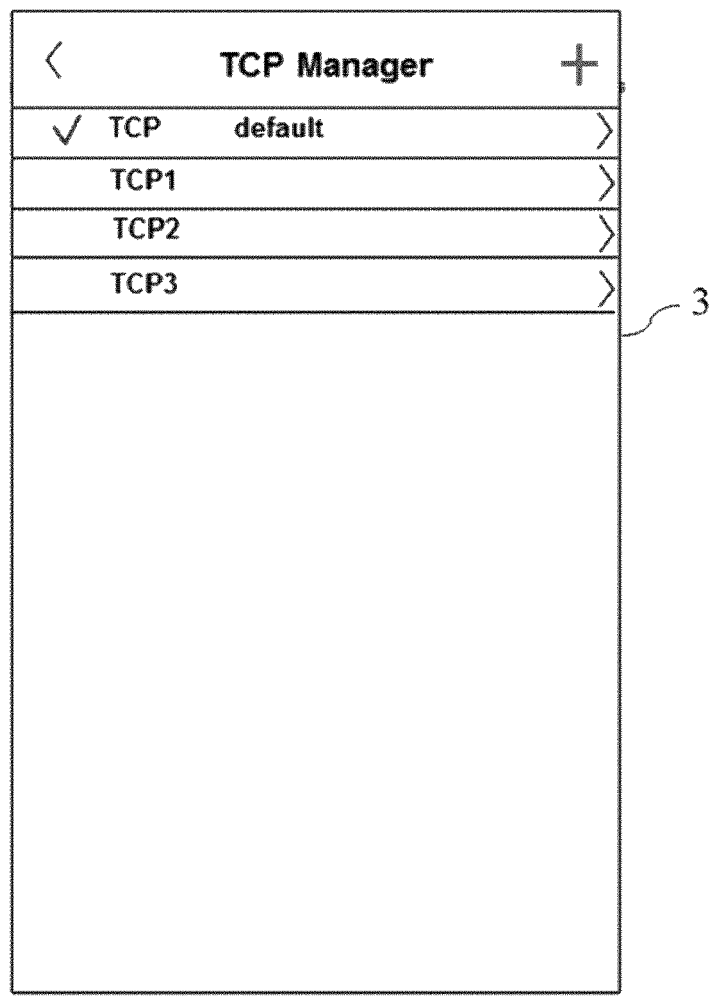
FIG. 2 is an interface of tool center point management according to the embodiment of the present invention.
Figure 3:
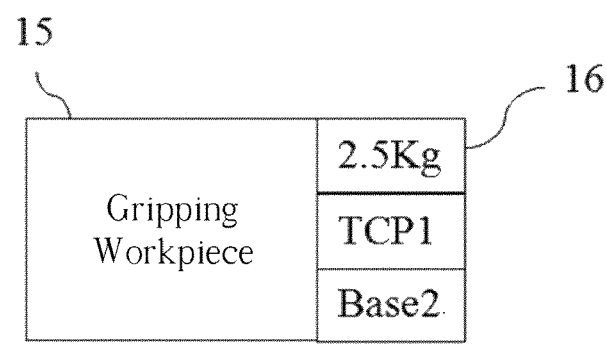
FIG. 3 is an illustration of an operation sub-process for gripping a workpiece.

Please refer to FIG. 1 to FIG. 3. FIG. 1 is an illustration of a robot arm 1 according to the embodiment of the present invention. FIG. 2 is an interface of tool center point management according to the embodiment of the present invention. FIG. 3 is an illustration of an operation sub-process for gripping a workpiece. In FIG. 1, a terminal of the robot arm 1 is fixed on an upper surface of a control device 2. The upper surface of the control device 2 can be regarded as a robot base RB corresponding to coordinates of the robot arm 1. The control device 2 is coupled to an operation panel 4 having a display 3 by using a wireless or a wired connection. The control device 2 is used for programming an operation process or controlling the robot arm 1. Another terminal of the robot arm 1 is a movable end 5. A visual device (i.e., for example, eye in hand, EIH) 6 is disposed on the movable end 5. A tool 7 is disposed on a terminal of the movable end 5. The tool 7 can be a gripper or a soldering gun. Particularly, different tools have different shapes and size. Thus, the tool 7 has its own tool center point (TCP) 8. The robot arm 1 can be operated according to the tool center point 8. In the embodiment, the robot arm detects the tool center point 8 corresponding to the tool 7 currently used and then saves tool center point data of the tool 7. For example, the tool center point data can be saved as a tool name or a tool code illustrated in FIG. 2. Then, the interface of tool center point management can be displayed on the display 3, which can be operated and selected by a user. When a tool is selected to apply to the robot arm 1, relative position data between the movable end 5 of the robot arm 1 and the tool 7 can be acquired for calibrating a motion of the robot arm 1.

In the embodiment of the present invention, a feeding conveyor belt 9 can be used for transmitting a big workpiece 10 and a small workpiece 11 to the robot arm 1 so that the materials can be used by the robot arm 1 for fabricating products. The feeding conveyor belt 9 has a feeding base (Base 1) B1. A workbench 12 is disposed under the robot arm 1. The workbench 12 can process the workpiece and has a working base (Base 2) B2. The robot arm 1 can use a finished product conveyor belt 13 for transmitting a finished product 14. The finished product conveyor belt 13 has a finished product base (Base 3) B3. In the embodiment, the robot arm 1 can be programmed by using the operation panel 4. Then, the robot arm 1 can be controlled to grip the big workpiece 10 and the small workpiece 11 on the feeding conveyor belt 9. Further, the big workpiece 10 and the small workpiece 11 can be moved to the workbench 12 for fabricating to generate the finished product 14. Then, the finished product 14 can be gripped by the robot arm 1 and is moved on the finished product conveyor belt 13.

The control device 2 can pre-program several standard operation sub-processes such as a motion sub-process, a resetting sub-process, a workpiece gripping sub-process, a workpiece placing sub-process, a workpiece combining sub-process, and a tool replacing sub-process according to configurations of the base, the tool, and a workpiece weight before the robot arm 1 is programmed. In FIG. 3, for programming the workpiece gripping sub-process, a gripping tool TCP1 is mounted to the tool 7 of the robot arm 1. Then, the gripping tool TCP1 moves to an appropriate position of the working base B2 according to a position of the workpiece 11 on the workbench 12. Then, the visual device 6 captures an image of the workpiece 11 on the working base B2. The position of the workpiece 11 can be further determined by processing the image. Then, the robot arm 1 can be automatically hauled to the position of the workpiece 11 without colliding to the workpiece 11 according to a center point of the gripping tool TCP1. Then, the robot arm 1 can grip the workpiece 11 with a predetermined weight equal to 2.5 Kg. Then, the robot arm 1 can be held at a predetermined height from the working base B2. Finally, the workpiece gripping sub-process can be generated (or say, be programmed) according to gripping steps previously mentioned. For example, the workpiece gripping sub-process can save an operational position icon 15 as an operation name or an operation code. Further, important configurations such as configurations of the workpiece weight, the tool center point, or the base can be presented as operational configuration sub-icons 16, which adjoin the operational position icon 15. Additionally, configurations of the operation sub-process are modified when configurations of the operational configuration sub-icon 16 are modified.

Figure 4:
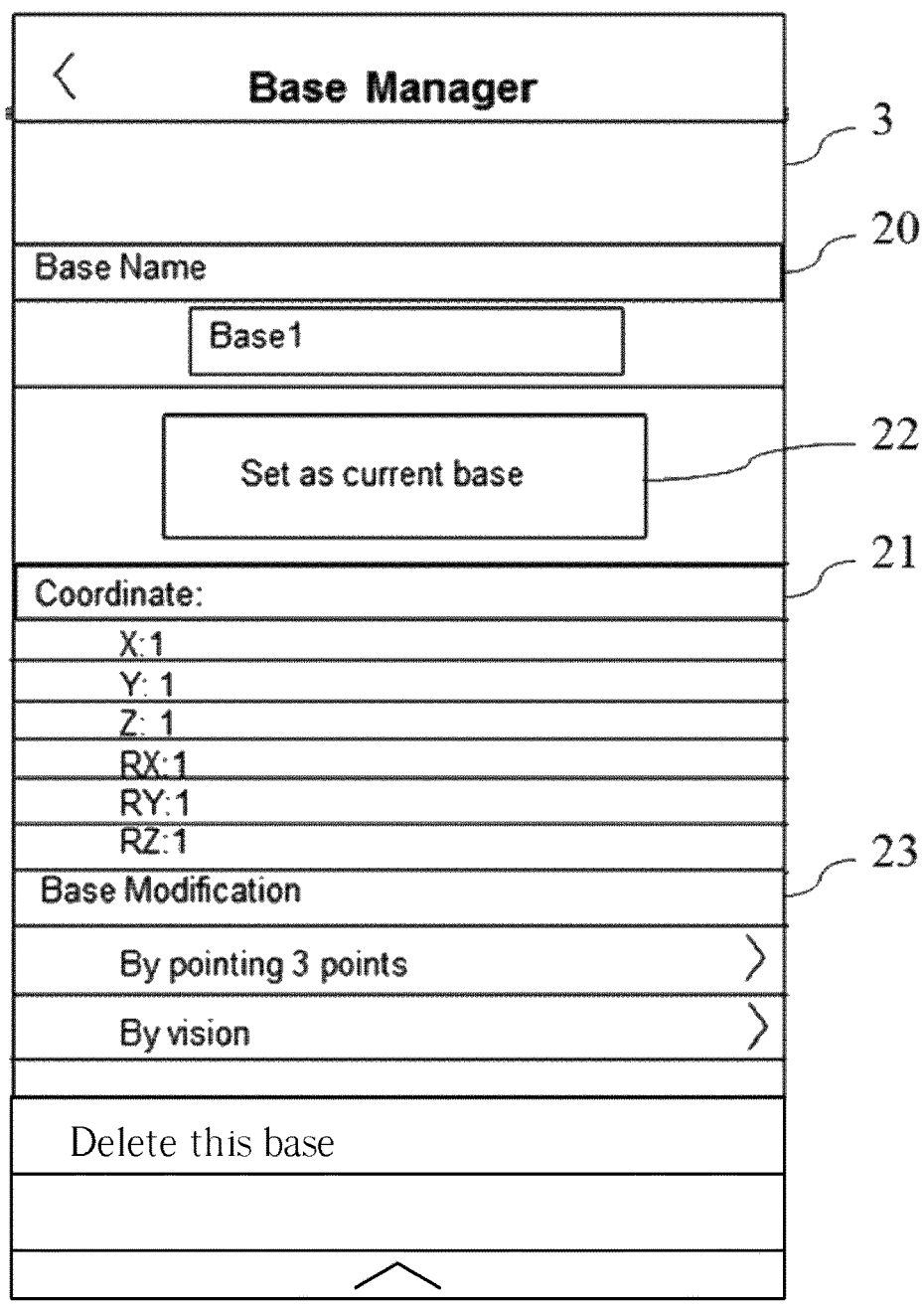
FIG. 4 is an interface for establishing a base.
Figure 5:
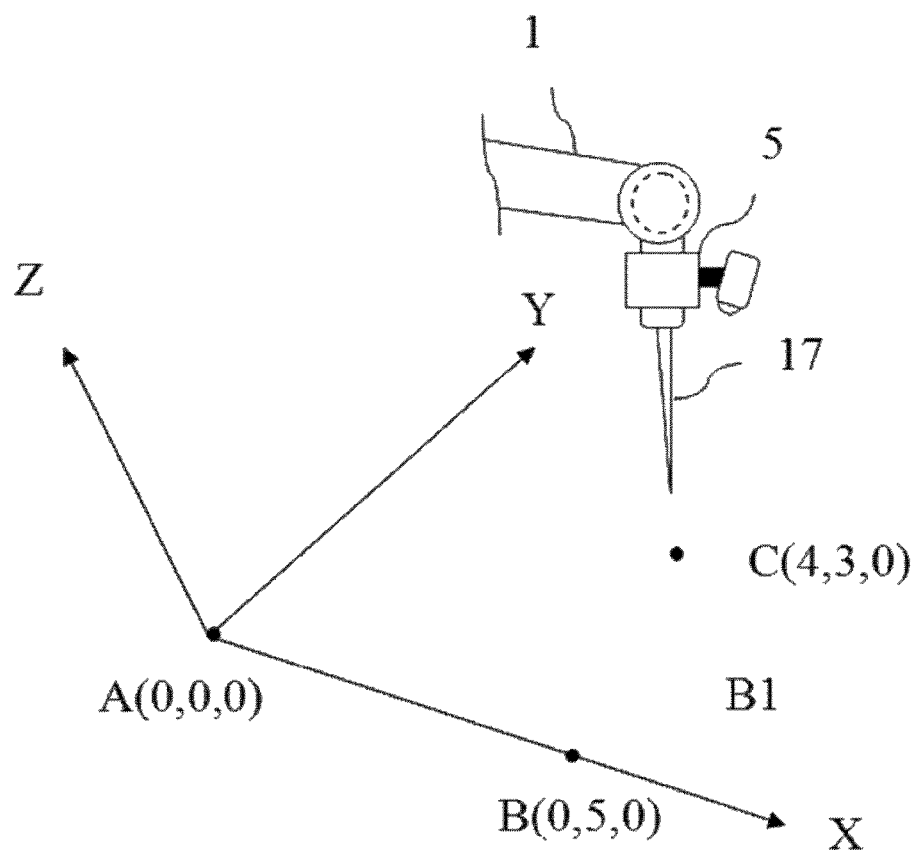
FIG. 5 is an illustration of a three-point base generation method.
Figure 6:
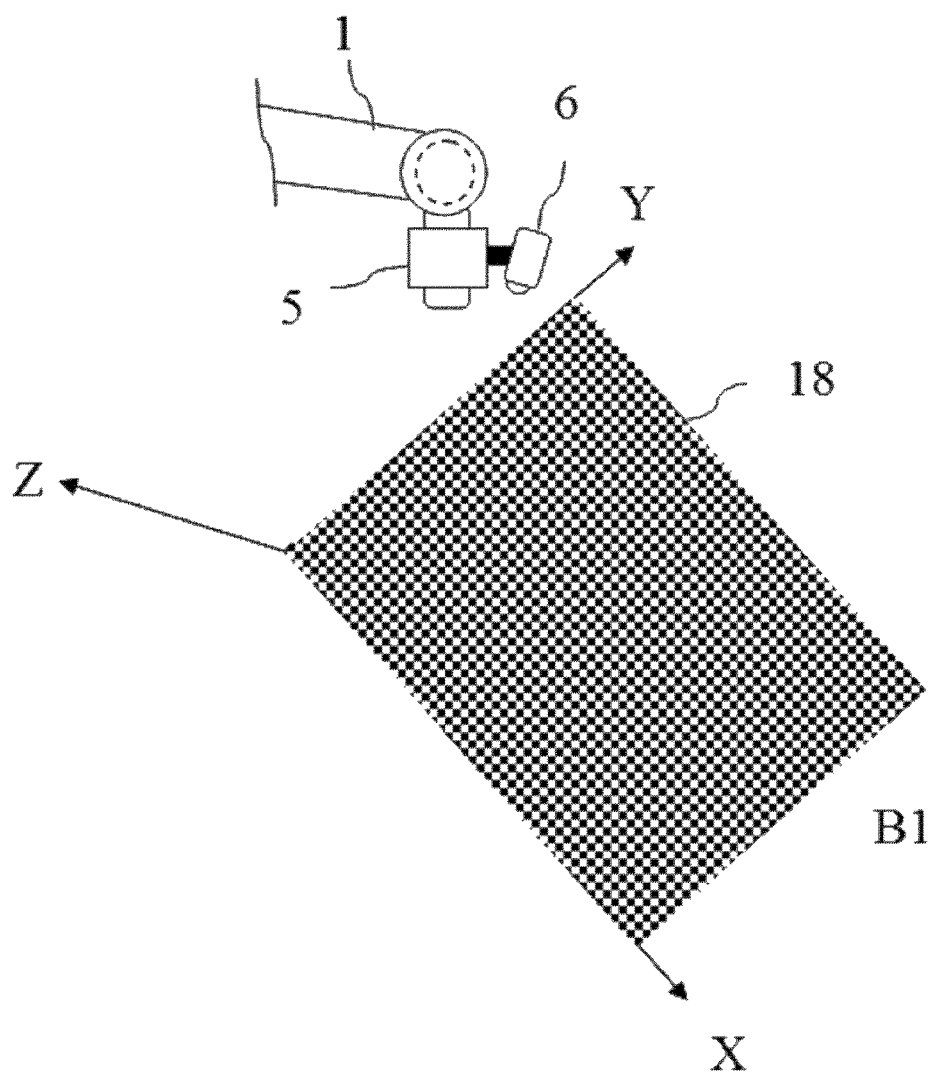
FIG. 6 is an illustration of a visual base generation method.
Figure 7:
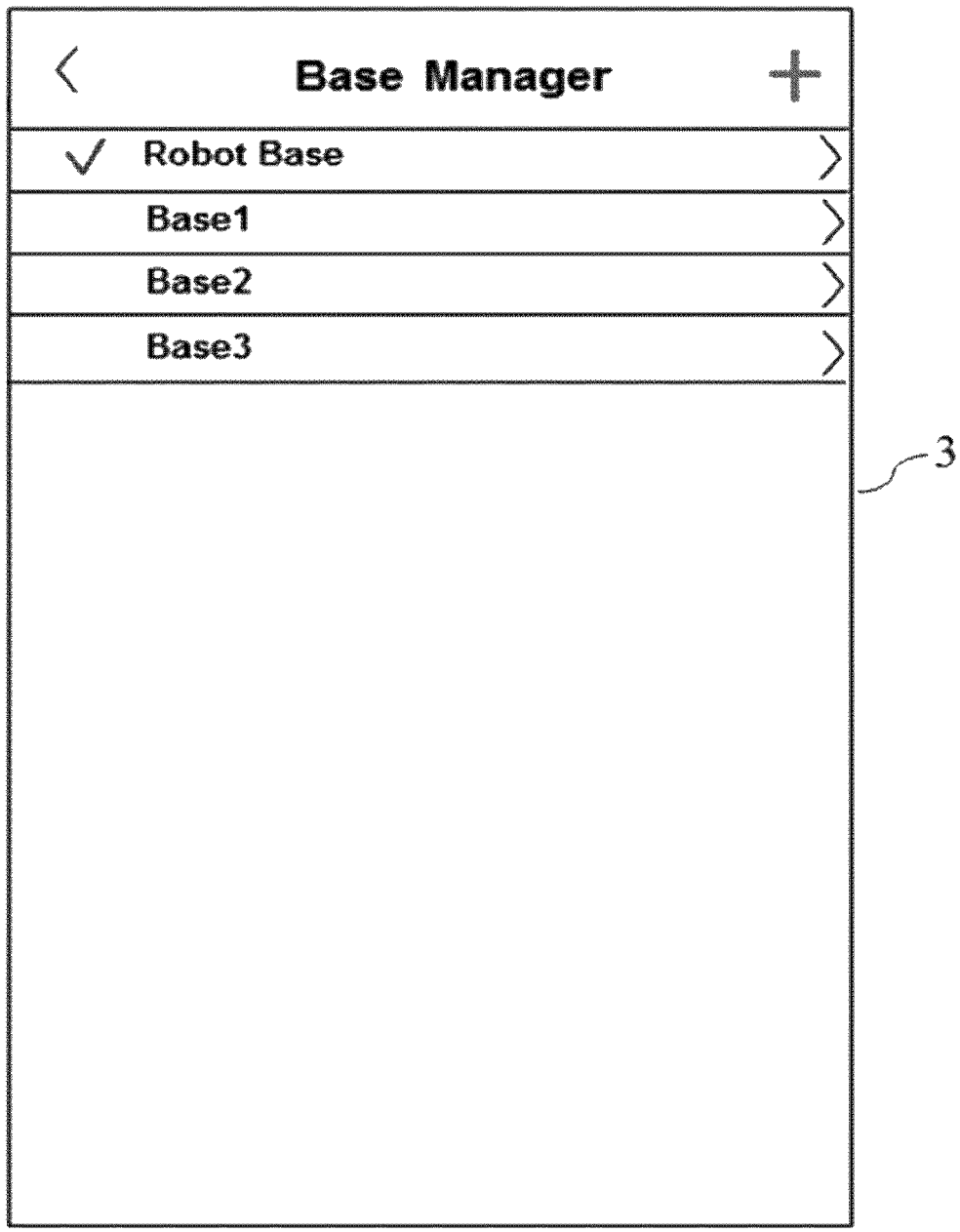
FIG. 7 is an interface for selecting the base.

Please refer to FIG. 4 to FIG. 7. FIG. 4 is an interface for establishing a base. FIG. 5 is an illustration of a three-point base generation method. FIG. 6 is an illustration of a visual base generation method. FIG. 7 is an interface for selecting the base. In the embodiment, each standard operation sub-process is executed according to a specific base. However, all standard operation sub-processes may be executed according to different bases. In other words, when a configuration of a base is erred, the robot arm 1 may acquire an erred relative position. Thus, the workpiece may be damaged because of collision. Thus, in the embodiment, when the robot arm 1 is programmed, an interface can be displayed on the display 3 for generating the robot base RB, the feeding base B1, the working base B2, and the finished product base B3. All base generation processes are identical. For example, in the feeding base B1 generation process, a name or a code of the feeding base B1 can be inputted to a base name space 20. Here, the code of the feeding base B1 is inputted to the base name space 20 as "Base 1". Then, a user can refer to a default (or say, pre-stored) coordinates displayed on a coordinate window 21. If coordinates of the feeding base B1 consist with coordinates display on the window 21, a user can press "set as current base" button 22. Then, the coordinates displayed on a coordinate window 21 can be directly applied to the feeding base B1 generation process for simplifying operational complexity of base generation process. If coordinates of the feeding base B1 and coordinates display on the window 21 are inconsistent, the user has to select a method for generating the feeding base B1 by using a base modification window 23.

In the embodiment, a three-point base generation method and a visual base generation method are introduced. FIG. 5 is an illustration of the three-point base generation method. In FIG. 5, a meter device 17 is disposed on the movable end 5 of the robot arm 1 and can be used for detecting coordinates of three points A, B, and C on different axes of the feeding base B1 for establishing and saving the feeding base B1. FIG. 6 is an illustration of a visual base generation method. In FIG. 6, a calibration plate 18 with interleaved black and white grids is stuck on the feeding base B1. Then, the robot arm 1 is hauled on top of the calibration plate 18. Then, an inclination of the robot arm 1 is calibrated (or say, tilt calibration) automatically by using the visual device 6 and the calibration plate 18. Then, the movable end 5 is aligned in direction of a normal vector of the calibration plate 18. The robot arm 1 moves and detects the feeding base B1 according to a predetermined focal length for establishing and saving the feeding base B1. In the embodiment, the three-point base generation method and the visual base generation method are introduced. However, the present invention is not limited to use the three-point base generation method and the visual base generation method. Further, other bases such as the working base B2 and the finished product base B3 can be generated by using the process of generation method of the feeding base B1. After all bases are generated, information of the robot base RB, the feeding base B1, the working base B2, and the finished product base B3 can be saved as corresponding icons (i.e., Robot Base, Base 1, Base 2, and Base 3 as shown in FIG. 7), which can be selected by the user.

Figure 8:
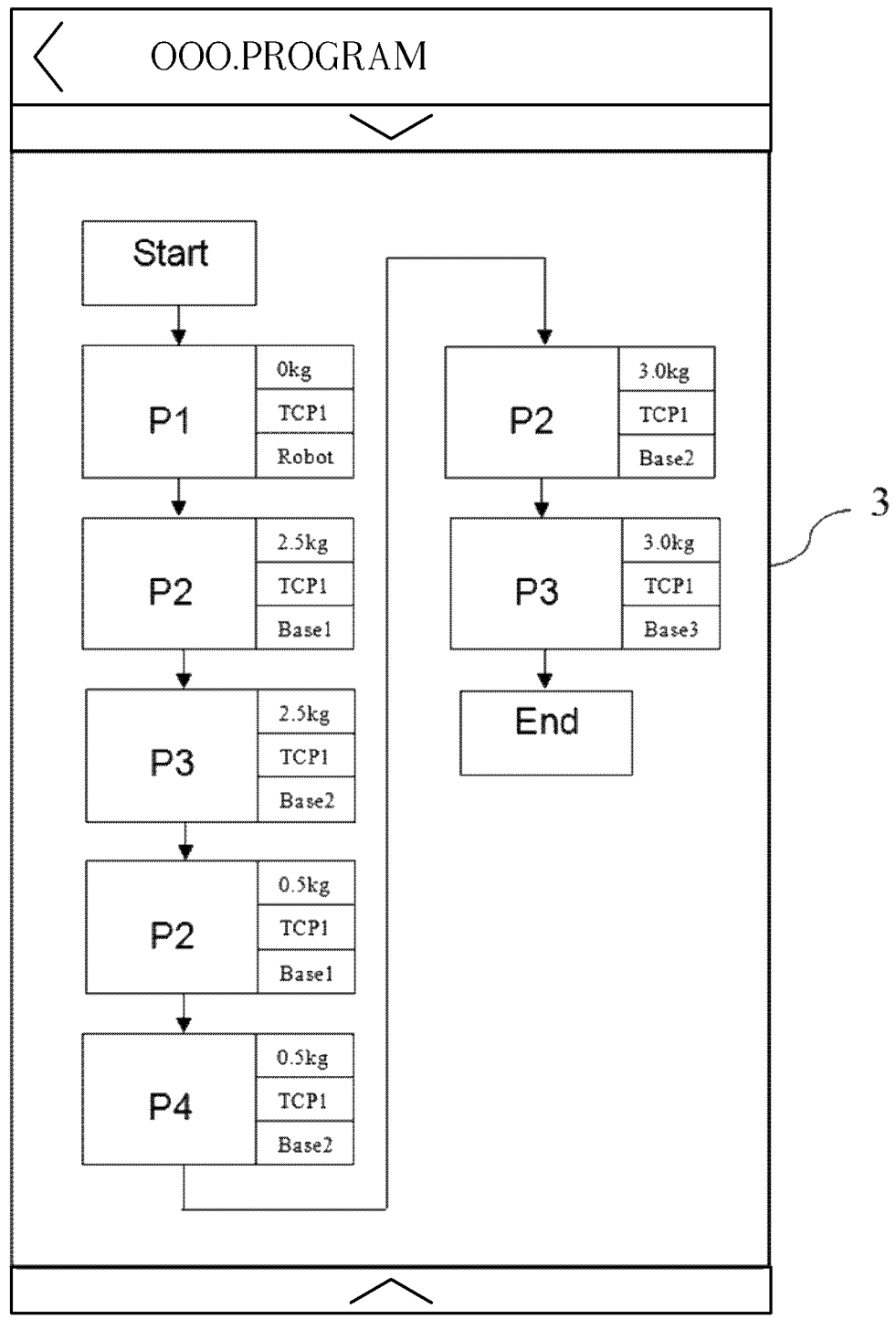
FIG. 8 is an interface for programming the robot arm according to the embodiment of the present invention.

Please refer to FIG. 1 and FIG. 8. FIG. 8 is an interface for programming the robot arm according to the embodiment of the present invention. After the programming interface is displayed on the display 3, an operational program name is inputted to a window 24 (i.e., "OOO.PROGRAM"). Then, a user can click a start icon to enter the programming process. The user can use the interface for establishing an operation process according to several pre-stored operation sub-process icons. For example, the user can select an operational position icon P1 (i.e., for example, a position resetting icon) for applying to a position resetting sub-process. The user can further modify an operational configuration sub-icon as "0 Kg". By doing so, the robot arm 1 can use the gripping tool TCP1 for gripping a workpiece with 0 Kg. In other words, the gripping tool TCP1 here can grip a virtual workpiece (i.e., empty space). Thus, the robot arm 1 with no workpiece can be moved to an initial position of a robot base RB. Further, the user can select an operational position icon P2 (i.e., for example, a workpiece gripping icon) for applying to a workpiece gripping sub-process. The user can further modify an operational configuration sub-icon as "2.5 Kg". By doing so, the robot arm 1 can use the gripping tool TCP1 for gripping a big workpiece 11 with 2.5 Kg on the feeding base B1 of the feeding conveyor belt 9. Further, the user can select an operational position icon P3 (i.e. for example, a workpiece placing icon) for applying to a workpiece placing sub-process. The user can further modify an operational configuration sub-icon as "2.5 Kg". By doing so, the robot arm 1 can use the gripping tool TCP1 for gripping a big workpiece 11 with 2.5 Kg and placing the big workpiece 11 on the working base B2 of the workbench 12.

Then, the user can select an operational position icon P2 following the operational position icon P3 for applying to the workpiece gripping sub-process. The user can further modify an operational configuration sub-icon as "0.5 Kg". By doing so, the robot arm 1 can use the gripping tool TCP1 for gripping a small workpiece 10 with 0.5 Kg on the feeding base B1. Then, the user can select an operational position icon P4 (i.e., for example, i.e., a workpiece combining icon) for applying to a workpiece combining sub-process. The user can further modify an operational configuration sub-icon as "0.5 Kg". By doing so, the robot arm 1 can use the gripping tool TCP1 for combining the small workpiece 10 with 0.5 Kg and the big workpiece 11 with 2.5 Kg already placed on the working base B2. After the small workpiece 10 with 0.5 Kg and the big workpiece 11 with 2.5 Kg are combined, a finished product 14 is generated. Then, the user can select an operational position icon P2 following the operational position icon P4 for applying to the workpiece gripping sub-process. Here, the "workpiece" can be regarded as the "finished product 14". The user can further modify an operational configuration sub-icon as "3.0 Kg" (i.e., 2.5 Kg+0.5 Kg). By doing so, the robot arm 1 can use the gripping tool TCP1 for gripping the finished product 14 with 3.0 Kg on the working base B2. Finally, the user can select an operational position icon P3 following the operational position icon P2 for applying to the workpiece placing sub-process. The user can further modify an operational configuration sub-icon as "3.0 Kg". By doing so, the robot arm 1 can use the gripping tool TCP1 for gripping the finished product 14 with 3.0 Kg and placing the finished product 14 on the finished product base B3 of the finished product conveyor belt 13. Then, the finished product 14 can be transmitted by using the finished product conveyor belt 13. In the embodiment, the robot arm can be programmed by using a quick method according to several pre-stored sub-processes and several modifiable operation sub-process icons.

Figure 9:
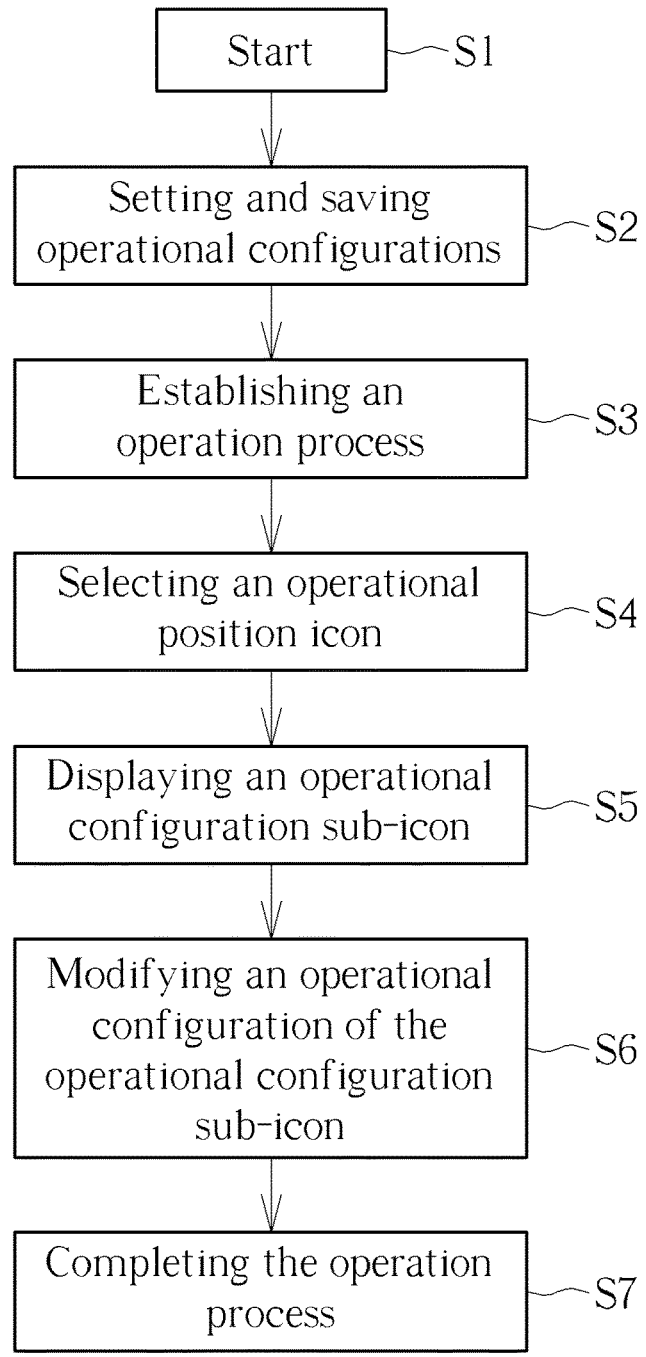
FIG. 9 is a flowchart of a programming method of the robot arm of the present invention.

FIG. 9 is a flow chart of a programming method of the robot arm of the present invention. The programming method of the robot arm includes step S1 to step S7, illustrated as follows. In step S1, an operation process for programming the robot arm is started. In step S2, operational configurations of the robot arm are set and saved. In step S3, an operation process of the robot arm is established. In step S4, an operational position icon is selected for applying to the operation sub-process. Specifically, the operational position icon and the operation sub-process are pre-stored in the operation process. In step S5, a selected operational position icon and an operational configuration sub-icon are displayed on the display. In step S6, an operational configuration displayed on the operational configuration sub-icon is modified. In step S7, the operation process of the robot arm is completed.

In the programming method of the robot arm of the present invention, when at least one operational configuration has to be changed (i.e., a configuration of the base, a configuration of the workpiece weight, a configuration of replacing tool), a user can select an operational configuration sub-icon for setting and changing its default configurations in order to directly applied to the program for executing the operation sub-process. Further, when a default operation process or an approximate operation process is applied, a selected operational position icon previously stored can be easily amended (i.e., added or canceled) in order to apply the operation sub-process for executing the operation process of the robot arm. By doing so, a quick method for programming the robot arm can be performed. Further, since the operational configuration sub-icon can be labeled in or adjoin the operational position icon, the user can directly inspect all configurations without executing a debugging process. Thus, when configuration error occurs, the user can directly find the erred configuration and then calibrate the erred configuration by modifying operational position data.

To sum up, in the programming method of the robot arm of the present invention, when the robot arm is programmed, the operational position icon and the operational configuration sub-icon displayed on the display can be used for performing quick configurations modifications and a quick error checking process, which can be directly applied to the operation process of the robot arm. Also, the user can add a new operational position icon, delete an original operational position icon, or modify a current operational configuration sub-icon in order to quickly adjust the operation process of the robot arm. Thus, operational flexibility of robot arm can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A programming method of a robot arm by using an operational position icon corresponding to an operation sub-process comprising:
   setting and saving operational configurations of the robot arm;
   establishing an operation process of the robot arm;
   selecting the operational position icon for applying to the operation sub-process;
   displaying a selected operational position icon and an operational configuration sub-icon;
   modifying an operational configuration displayed on the operational configuration sub-icon; and
   completing the operation process of the robot arm;
   wherein the operational position icon adjoins the operational configuration sub-icon, and configurations of the operation sub-process are modified when configurations of the operational configuration sub-icon are modified.

2. The programming method of claim 1, wherein the operation sub-process is programmed to generate a plurality of standard operation sub-process according to the operational configuration, the operational configuration is default, and the operation sub-process saves the operational position icon as an operation name or an operation code.

3. A programming method of a robot arm by using an operational position icon corresponding to an operation sub-process comprising:
   setting and saving operational configurations of the robot arm;
   establishing an operation process of the robot arm;
   selecting the operational position icon for applying to the operation sub-process;
   displaying a selected operational position icon and an operational configuration sub-icon;
   modifying an operational configuration displayed on the operational configuration sub-icon; and
   completing the operation process of the robot arm;
   wherein the operational configuration comprises a workpiece weight, a tool center point, or a base, the base is generated by a three-point base generation method or a visual base generation method, and the three-point base generation method comprises detecting coordinates of three points on different axes of the base by using a meter device disposed on the robot arm for establishing and saving the base.

4. The programming method of claim 3, wherein the robot arm pre-detects a tool center point corresponding to a tool currently used and saves tool center point data of the tool.

5. The programming method of claim 4, wherein the tool center point data comprises relative position data between the robot arm and the tool for calibrating a motion of the robot arm.

6. The programming method of claim 3, wherein the visual base generation method comprises:
   sticking a calibration plate on the base;
   hauling the robot arm on top of the calibration plate;
   calibrating an inclination of the robot arm automatically;
   the robot arm moving and detecting the base according to a predetermined focal length so as to establishing and saving the base.

7. The programming method of claim 3, wherein when a program of the operation process of the robot arm is not modified, a default operation process is directly applied to the program for executing the operation sub-process.

8. The programming method of claim 1, wherein when a default operation process or an approximate operation process is applied, a selected operational position icon previously stored is changed in order to apply the operation sub-process for executing the operation process of the robot arm.

9. The programming method of claim 1, wherein the selected operational position icon and the operational configuration sub-icon are modifiable and displayed on a display of an operation panel of the robot arm.

* * * * *